United States Patent
Heim et al.

[11] Patent Number: 5,469,668
[45] Date of Patent: Nov. 28, 1995

[54] VEHICLE DOOR

[75] Inventors: Gunther Heim, Obertshausen; Bruno Kroll, Radevormwald, both of Germany

[73] Assignee: YMOS Aktiengesellschaft Industrieprodukte, Obertshausen, Germany

[21] Appl. No.: 204,075

[22] Filed: Mar. 1, 1994

[30] Foreign Application Priority Data

Mar. 1, 1993 [DE] Germany .......................... 43 06 290.3

[51] Int. Cl.⁶ ........................................................ B60J 5/04
[52] U.S. Cl. ................... 49/502; 49/349; 49/351; 49/352
[58] Field of Search .............................. 49/502, 348, 349, 49/350, 351, 352; 296/146.2, 146.5, 146.6

[56] References Cited

U.S. PATENT DOCUMENTS

| | | | |
|---|---|---|---|
| 4,653,230 | 3/1987 | Seo et al. .................................. | 49/502 |
| 4,800,638 | 1/1989 | Herringshaw et al. .......... | 296/146.5 X |
| 4,876,825 | 10/1989 | Widrig et al. ............................. | 49/502 |
| 4,920,697 | 5/1990 | Vail et al. .................................. | 49/348 |
| 4,934,099 | 6/1990 | Maekawa et al. ..................... | 49/502 X |
| 5,086,589 | 2/1992 | dibenedetto ............................... | 49/506 |

FOREIGN PATENT DOCUMENTS

| | | |
|---|---|---|
| 0142435 | 5/1985 | European Pat. Off. . |
| 0432590 | 6/1991 | European Pat. Off. . |
| 2101535 | 1/1983 | United Kingdom . |

Primary Examiner—Philip C. Kannan
Attorney, Agent, or Firm—W. G. Fasse; W. F. Fasse

[57] ABSTRACT

A vehicle door, for example for a passenger car, has a frame structure with a forward frame section (2), at least one upper frame section (1A, 4), a rear frame section (3) and preferably also a lower frame section (5). A single window frame section forms a first window and guide member (9) is connected between the forward frame section (2) and upper frame section (1A) or to the upper frame section and to a junction between the forward and lower frame sections. A second window guide member (3A) forms an integral part of the rear frame section. The door frame and its frame sections and door components form a module. A window lifting and lowering device is supported and guided in the door frame structure. The first and second window guide members (9, 3A) are fully integrated into the frame structure.

20 Claims, 12 Drawing Sheets

VEHICLE DOOR

CROSS-REFERENCE TO RELATED APPLICATION

The present application is related to our and commonly assigned application for a "VEHICLE DOOR FRAME AND METHOD FOR MAKING THE SAME" U.S. Ser. No. 08/204,080, filed on: Mar. 1, 1994, Docket No.: 2980.

FIELD OF THE INVENTION

The invention relates to vehicle doors, especially passenger car doors with a frame construction that constitutes a modular unit for supporting various door components such as a window and a device for opening and closing the window.

BACKGROUND INFORMATION

A supporting frame structure for a vehicle door includes at least one forward frame section as viewed in the length direction of the vehicle, a rear frame section, and at least one upper frame section forming together a modular support unit. The door also includes a device for opening and closing a window as well as guide members for guiding the window when it is raised and lowered. Further door elements such as hinges, a door lock and respective operating components for the lock also form part of such modular units. The device for lifting and lowering the window may, for example, be a rope or cable lifter or a lazy-tong lifter.

The features for guiding the window movements and for simplifying the entire structure still leave room for improvement, especially with regard to the weight of the entire unit and its assembly.

OBJECTS OF THE INVENTION

In view of the foregoing it is the aim of the invention to achieve the following objects singly or in combination:

- to optimize a vehicle door in such a way that the entire structure becomes lighter and a more cost efficient production is achieved, especially by a simplified assembly;
- to use at least part of a supporting door frame section simultaneously as a guide for the up and down movement of the window and as part of the door frame structure;
- to minimize the number of window guide members, preferably to one such member which is simultaneously used as a brace within the door frame; and
- to reduce the number of door components altogether, while still assuring the required structural strength.

SUMMARY OF THE INVENTION

The above objects have been achieved according to the invention in that a guide device for the window up and down movement comprises one window frame member with a window guide and one rear door frame section also with a window guide, and wherein both window guides are integrated into the door frame modular unit for strength.

The formation of a single structural unit comprising the door frame as a support module, the window lifting and lowering device, and the two window guides, permits an economic manufacture while simultaneously facilitating the assembly of the individual elements, because the number of individual elements is reduced to an optimally low number resulting in a product that itself is lightweight and hence easy to make and handle.

According to a further embodiment of the invention, a window movement guiding structure including a single window frame member forming a first window guide member, is positioned forwardly within the door frame for guiding the forward window pane edge when it is lifted and closed and when it is lowered and opened. This first window guide member and a rear section of the door frame are constructed as extruded sections, and the rear door frame section is constructed as a second window guide member for guiding the window pane. The rear door frame section performs a double function as a part of the door frame and as a part of the window guiding structure. The single window frame member also performs two functions as a brace in the door frame and as a window guide. These features reduce the number of the required parts which in turn has the advantage that the required man-hours and material costs for manufacturing the door are reduced.

The extruded section of the first window guide member and at least the extruded section of the door rear frame that forms a second window guide member preferably have a laterally open profiled chamber extending substantially along the entire length of the respective section or member for holding at least one free edge of the window in at least one of these profiled chambers in such a way that at any time during the raising and lowering of the window, at least one window edge is properly guided by the respective profiled channel. Thus, the window pane is guided with at least one of its lateral edges directly either in the single window frame member or in the rear door frame section, or both lateral window edges are simultaneously guided.

BRIEF DESCRIPTION OF THE DRAWINGS

In order that the invention may be clearly understood, it will now be described, by way of example, with reference to the accompanying drawings, wherein.

DETAILED DESCRIPTION OF PREFERRED EXAMPLE EMBODIMENTS AND OF THE BEST MODE OF THE INVENTION

Figure 1:
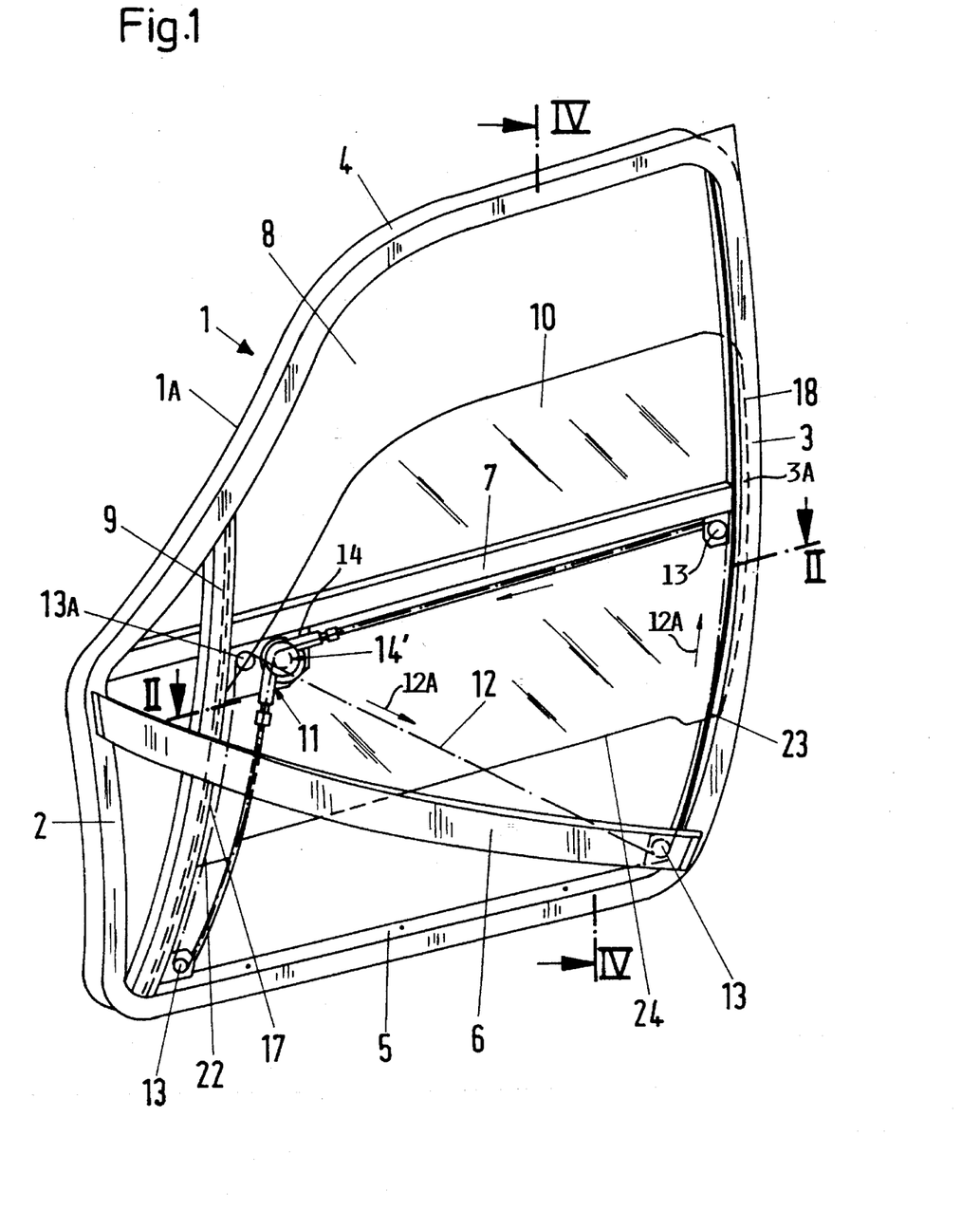
FIG. 1 is a perspective view of a door structural unit according to the invention comprising a door frame module, a rope window lifting and lowering device, and a window guide structure for a window pane.
Figure 2:
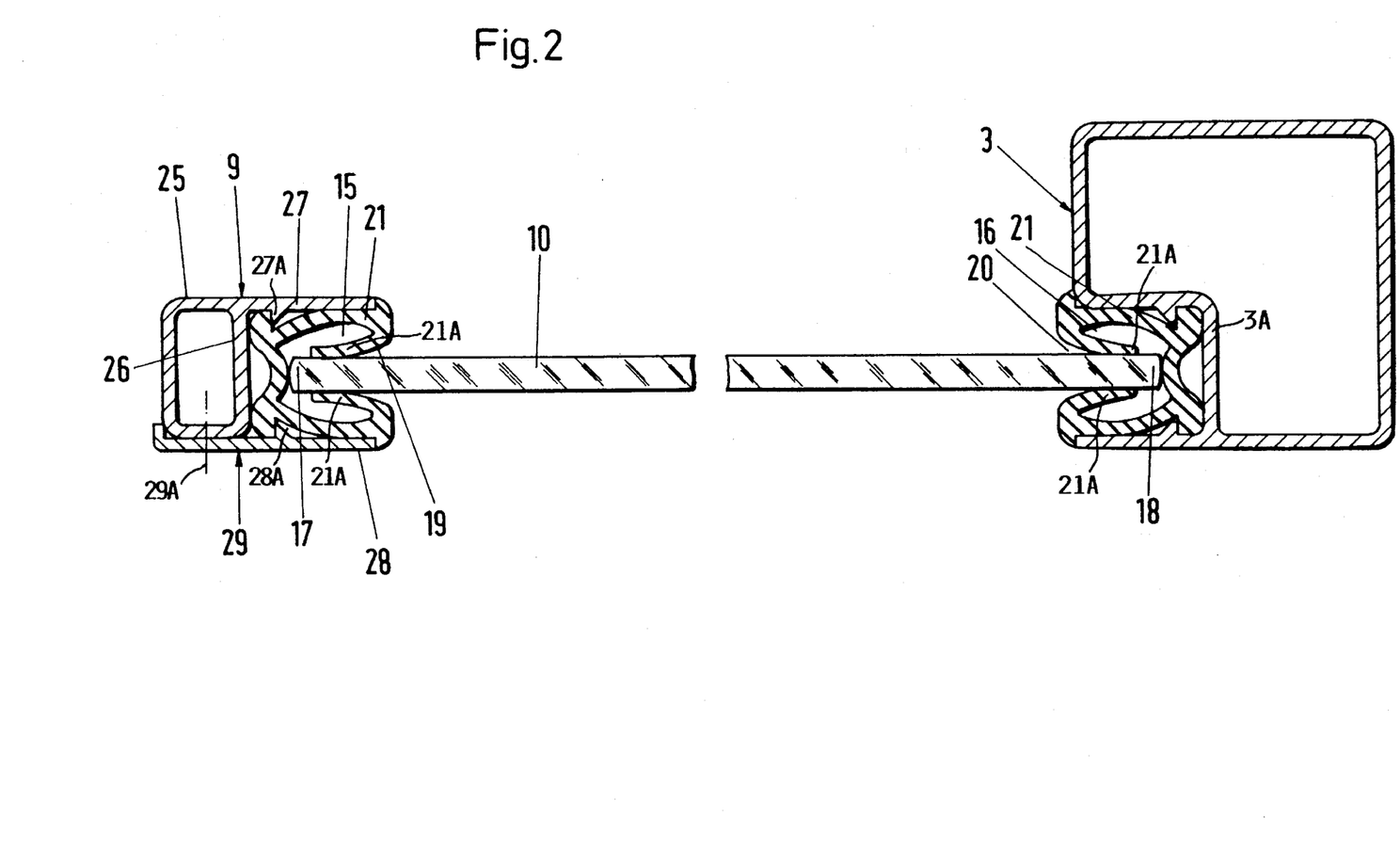
FIG. 2 is a sectional view along section line II—II in FIG. 1.
Figure 3:
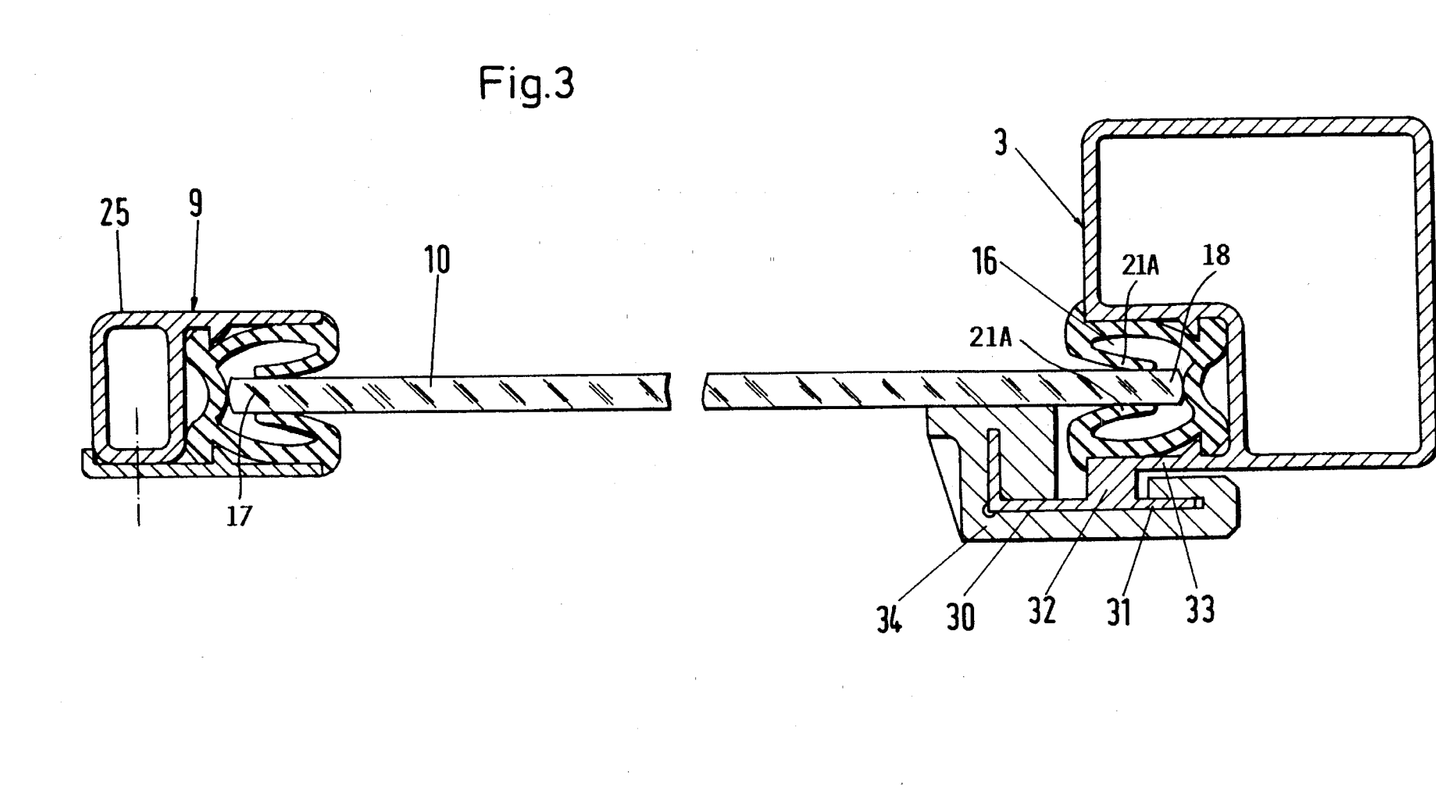
FIG. 3 is a view as in FIG. 2, however, showing a modified embodiment of the rear frame section.
Figure 4:
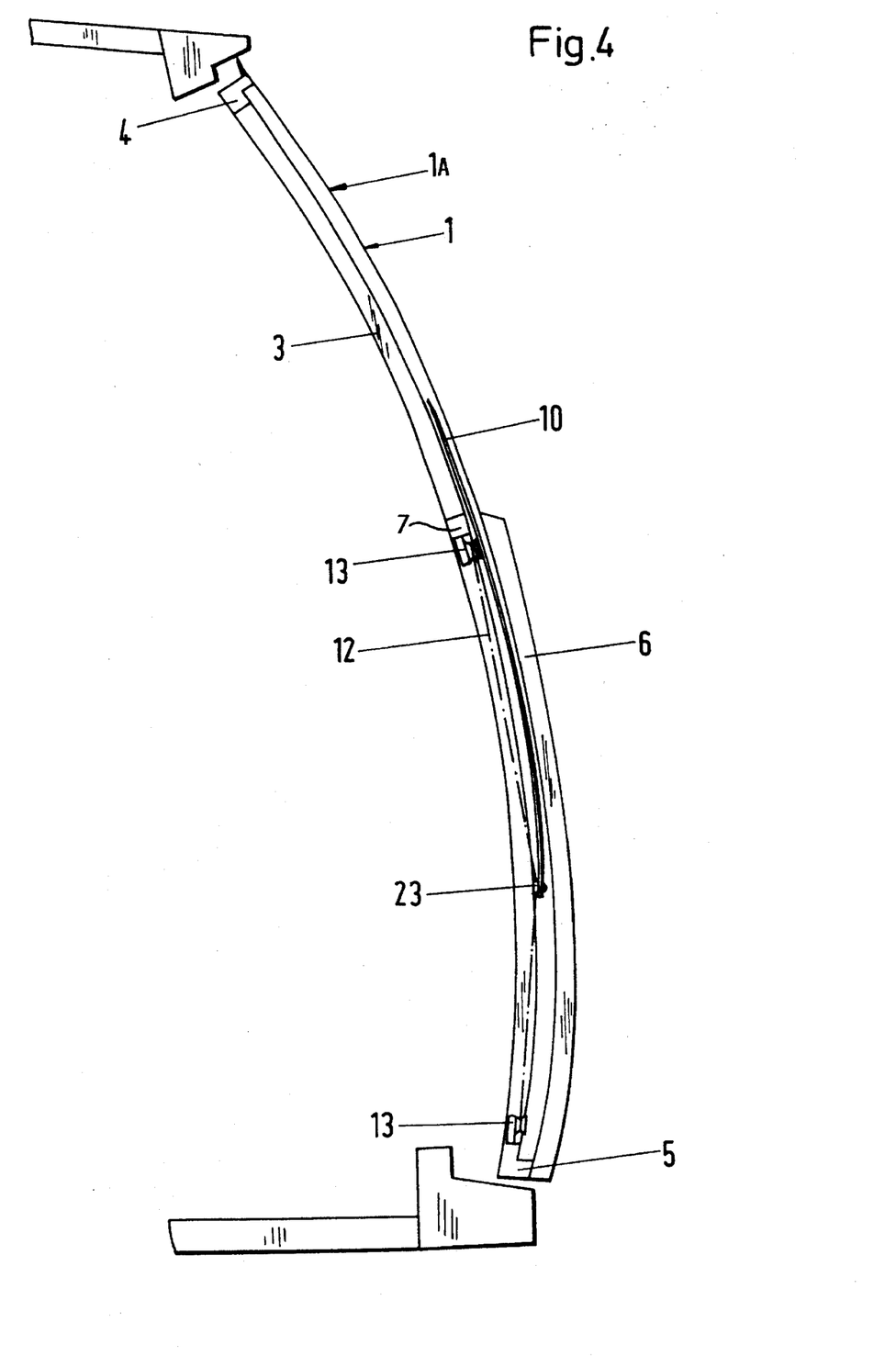
FIG. 4 is a sectional view along section line IV—IV in FIG. 1.

FIG. 1 shows a vehicle door, especially a passenger car door according to the invention, constructed as a frame structure comprising a door frame forming a supporting frame module 1 comprising a first upper frame section 1A, a second upper frame section 4, a rear frame section 3, a bottom frame section 5, and a forward frame section 2. The lower frame section 5 is optional. A diagonal strut 6 is connected to the upper end of the forward frame section 2 and to the lower end of the rear frame section 3, for example, by welding. One end of a cross-bar 7 is connected to the junction between the upper end of the forward frame section 2 and the lower end of the first upper frame section 1A. The other end of the cross-bar 7 is connected approximately to the center of the rear frame section 3. The strut 6 forms a diagonal brace for the frame structure while the cross-bar 7 forms a horizontal brace. As shown in FIGS. 2, 3, 4 the frame sections are extruded sections preferably hollow extruded sections.

The window frame comprises a single window frame member 9 extending substantially in parallel to the rear door frame section 3 and positioned close to the forward door frame section 2. The first window frame member or section 9 is connected at its upper end to the upper door frame section 1A and at its lower end to the lower end of the forward door frame section 2. If a lower door frame section 5 is used, the lower end of the single window frame member 9 is connected to the junction of the door frame sections 2 and 5 as shown in FIG. 1. The window frame member 9 limits a window opening 8 forwardly. Additionally the frame member 9 forms a guide for the window pane 10 which is movable up and down by a rope window lifting and lowering device 11.

The device 11 shown in FIG. 1 is a so-called rope lifter including a lifting rope 12 so connected to the window or window pane 10, that it can lift the window pane 10 from the shown half open position into the fully closed position when the pulling rope 12 moves in the direction of the arrows 12A around guide rollers 13. These guide rollers 13 are connected either directly to the window frame member 9 and/or to the door frame sections 3 and 7. One guide roller 13A is rotatably secured to a mounting plate 14 which is connected to the frame sections 2, 3, and 7 of the door frame module 1. If a lower door frame section 5 is used, the mounting plate 14 may also be connected to the lower door frame section 5. Further, a drive 14', such as a crank mounted on the mounting plate 14, is provided for the pulling rope 12. Such a structure is known as such so that a further description is not necessary.

As shown in FIG. 2, the guidance of the window pane 10 is accomplished by the single window frame forming a first window guide member 9 and/or by a guide channel 3A which is an integral part of the rear door frame section 3 and forms a second window guide member. For this purpose the member 9 and the frame section 3 each comprise a guide chamber or guide groove 15, 16 preferably extending substantially along the entire length of the respective frame section. The guide chambers 15 and 16 are laterally open and preferably face each other to receive a substantially vertical forward window edge 17 and a rear window edge 18 in these guide chambers 15 and 16. A profiled sealing and guide element 21 made of a rubber elastic material is held in each of the chambers or guide grooves 15 and 16 in such a way that the laterally facing open sides 19 and 20 can receive the respective window edge 17 or 18. However, the open sides 19, 20 of the chambers 15, 16 do not need to face each other because the window pane may have features for engaging the respective guide chambers even if their open sides face in different directions.

As best seen in FIG. 2, the sealing and guide element 21 has inwardly folded rims or lips 21A which bear elastically against the outer surfaces of the window pane edges 17 and 18 respectively so that the window pane 10 is held in a floating, yet properly guided manner.

Referring further to FIG. 1, the pulling rope 12 is secured to the window pane 10 at points 22 and 23 near the lower edge 24 of the window pane 10. These points 22 and 23 are positioned outside of the guide chambers 15 and 16 in the guide member 9 and frame member 3 respectively.

Referring further to FIG. 2, the first window guide member 9 is preferably constructed of at least two extruded, profiled sections 25 and 29 to facilitate the installation of the elastic guide and sealing element 21. The profiled section 25 has a hollow portion 26 and a wall section 27 with a shoulder 27A for holding a respective flange of the element 21. The profiled section 29 forms a cover 28 with a shoulder 28A for cooperating with the shoulder 27A in holding the element 21 in the channel 15. The two sections 25 and 29 are held together, after the element 21 has been installed, for example, by screws 29A merely shown symbolically. Self-tapping screws would be suitable for this purpose. The rear frame section 3 may also be constructed from two sectional elements or a single extruded piece may be used as shown. The guide and sealing element 21 is sufficiently elastic for insertion into the channel 16.

FIG. 3 illustrates a cross-section similar to that of FIG. 2 and the same elements are provided with the same reference numbers. The frame section 3 of FIG. 3 comprises guide ribs 30 and 31 forming an extension 32 of the channel forming wall 33 of the section 3. The extension 32 has an F-shaped cross-section secured to the wall 33. At least one guide piece 34 secured to the window pane 10, for example by an adhesive, grips around the extension 32 by engaging said guide ribs 30, 31. In this manner a double guide is provided for the window pane 10 in that the pane edge 18 is guided as in FIG. 2 and in that additionally the guide piece 34 guides the pane 10 with the aid of the frame extension 32.

It is essential to the invention as shown in all embodiments that at all times at least one of the window frame member 9 and the rear door frame section 3 with its guide channel 3A guide the window pane 10 along the entire lifting range or stroke of the window pane, whereby with regard to the rear edge 18 of the window pane 10, the guiding is fully integrated into the rear door frame section 3 so that a separate guide for the rear window edge 18 is avoided. The double guiding of the rear window edge 18 accomplished in FIG. 3 with the lips 21A and the guide piece 34 provides a positive guiding that is substantially more precise and assures a better seal than the embodiment of FIG. 2.

Figure 5:
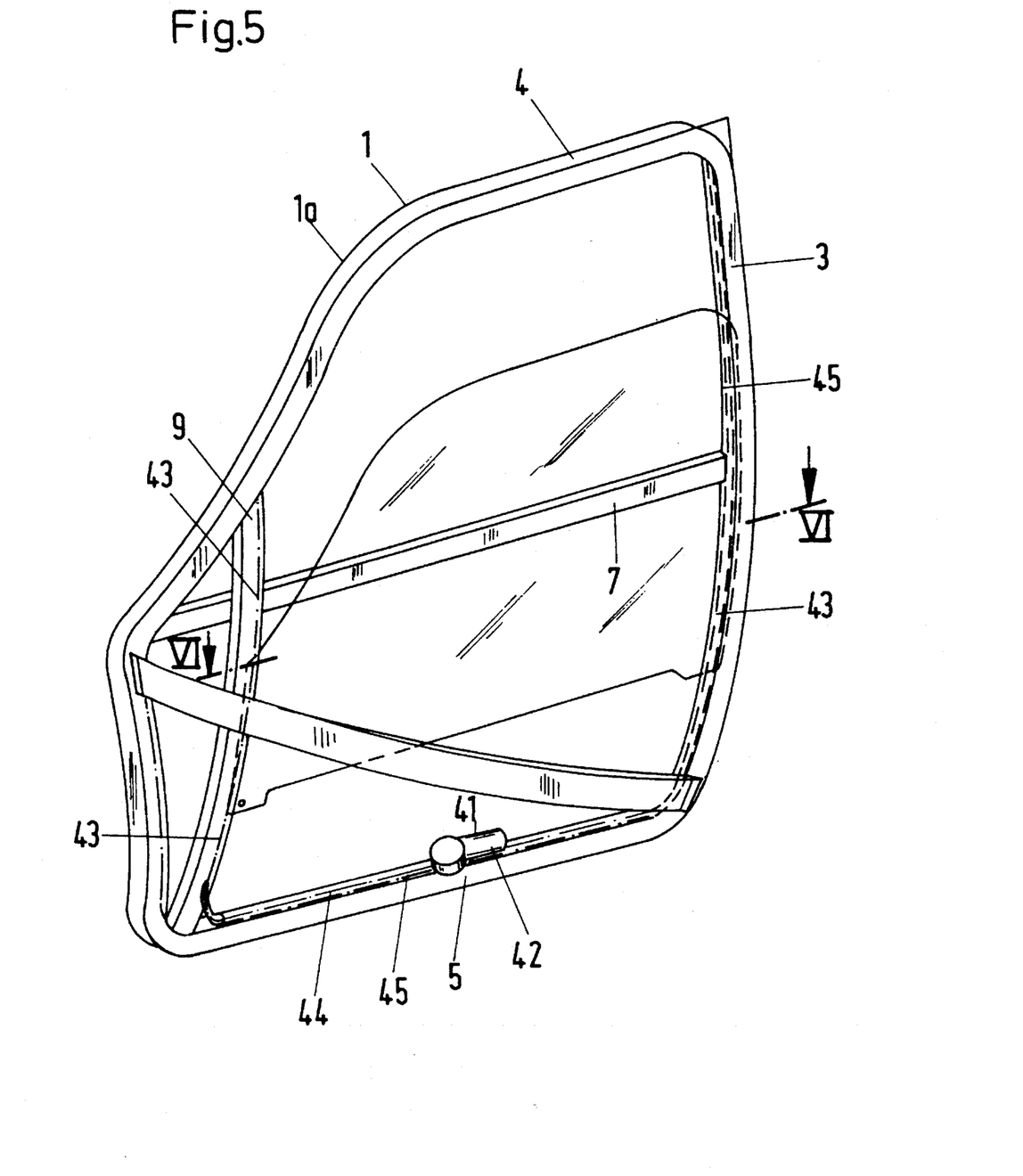
FIG. 5 is a perspective view as in FIG. 1, however provided with a cable window lifting and lowering device.
Figure 6:
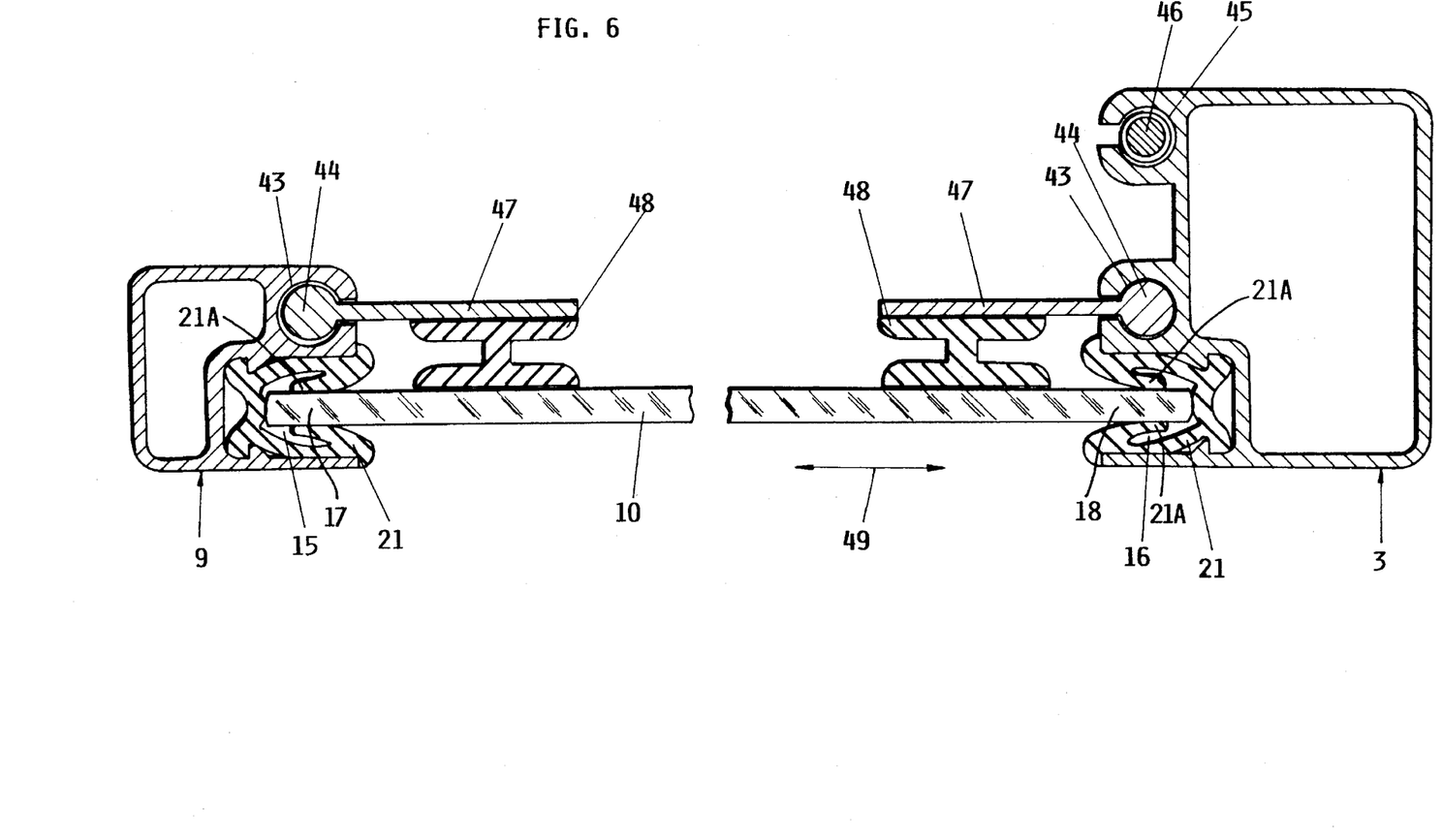
FIG. 6 is a view along section line VI—VI in FIG. 5.
Figure 7:
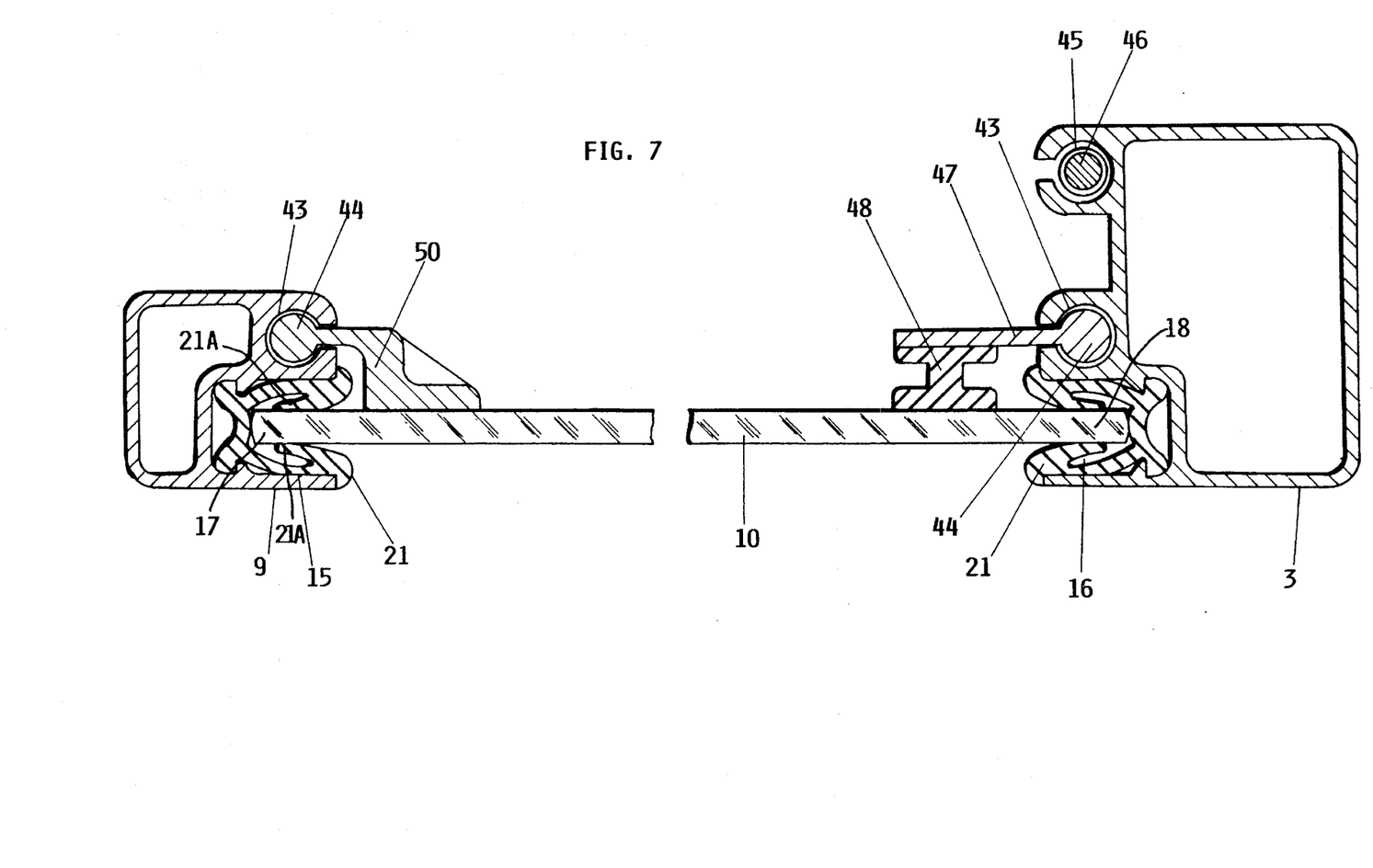
FIG. 7 is a sectional view as in FIG. 6, however illustrating a modified embodiment.

Referring to FIGS. 5, 6, and 7, the embodiment shown in these figures differs from the embodiment of FIGS. 1 to 4, primarily in that the rope window lifting and lowering device 11 has been replaced by a cable window lifter 41 comprising a drive 42, such as an electric motor. The lifter 41 uses a push-pull cable 44 guided in guide channels 43 provided in the window frame member 9 and in the rear frame section 3 as integral parts thereof. Where two push-pull cables 43 are used, a guide channel 45 for the return run of the respective cable is provided in the rear portion of the frame section 3 and two guide channels 43 and 45 are provided in the lower door frame section 5. The window frame member 9, however requires normally only one guide channel 43 for guiding the drive run of the push-pull cable 44.

The guide channels 43 extend parallel to the window pane 10 and are open parallel to the window pane 10 so that an entraining member 47 connects the window pane 10 with the respective portion of the push-pull cable 44 as seen in FIG. 6. The construction and configuration of the two entraining members 47 shown in FIG. 6 is the same for the front edge 17 of the window pane 10 and for the rear edge 18 of the window pane. Two identical, elastical buffers 48 are inserted between the entraining member 47 and the window pane 10 and held in place, for example, by a suitable adhesive. Due to the elasticity of the guide and sealing elements 21 especially their lips 21A and of the buffers 48, the window pane 10 is mounted in a floating manner in the profiled guide chambers 15 and 16 of the window frame guide member 9 and of the rear frame section 3, as indicated by the arrow 49 in FIG. 6.

In the embodiment of FIG. 7 the entraining member 47 is connected through an elastic buffer 48 to the rear edge 18 of the window pane 10 and thus to the door frame section 3. This construction is the same as in FIG. 6. However, the forward edge 17 of the window pane 10 in FIG. 7 is connected to the window frame guide member 9 by a modified guide and entraining piece 50 having a stylized Z-sectional configuration. The entraining piece 50 is connected to the respective run of the push-pull cable 44 which runs in the guide channel 43. Thus, the forward window pane edge 17 has a double guide between the flexibly yielding sealing and guide lips 21A of the sealing element 21 and in the guide channel 43 through the guide and entraining piece 50. This construction of FIG. 7 provides a substantially more precise guiding of the window pane 10 compared to the embodiment of FIG. 6.

The rope window lifting and lowering device 11 in the first embodiment cannot transmit compression forces, only tension forces can be transmitted by the rope 12. Contrary thereto, the push-pull cable 44 of the cable window lifting and lowering device 41 can transmit tension forces and compression forces. Normally, the drive 42 for the lifter device 41 comprises a motor driven pinion which cooperates with the push-pull cable 44 comprising for this purpose a threaded portion or spindle section.

The embodiment of FIGS. 8, 9, 10 and 11 uses a window lifting and lowering device 51 comprising a lazy-tong installed in the door frame module 1. Again, the same components are provided with the same reference numbers. According to the invention, the window pane 10 is guided in the window frame member 9 and in the rear frame section 3 of the door frame module 1. The cross-sections of the member 9 and of the rear frame section 3 are the same as in the other embodiments as shown by comparing FIGS. 2 and 9 with each other.

Figure 8:
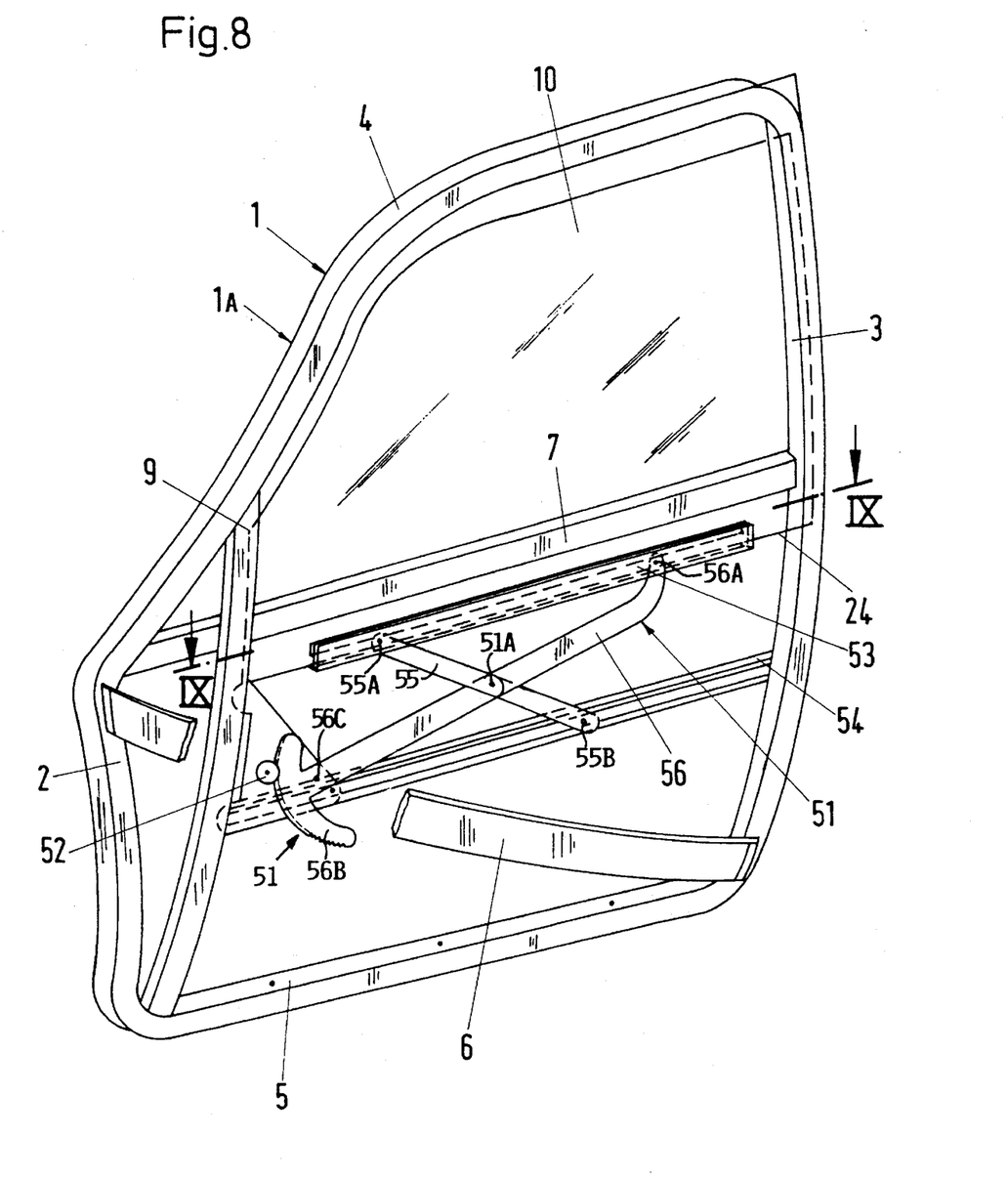
FIG. 8 is a perspective view as in FIGS. 1 and 5, however, illustrating a lazy-tong type window lifting and lowering device.

FIG. 8 shows the window 10 in an almost closed condition. The lower edge 24 of the window pane 10 is mounted in a rail 53 that has a guide channel for guiding guide pins 55A and 56A connected to upper ends of lazy-tong arms 55 and 56 respectively. The lazy-tong arms are journalled to each other at 51A to form the lifting and lowering device 51.

The lower end of the arm 55 has a guide pin or roller 55B riding in a guide rail 54 extending horizontally between the window frame member 9 and the rear door frame section 3. The guide rail 54 is rigidly connected to member 9 and frame section 3. The lower end of the arm 56 is provided with a curved gear rack 56B that meshes with a drive pinion 52. The toothed curved rack 56B is journalled at 56C to the rail 54. When the arm 56 turns clockwise, the arm 55 turns counterclockwise and the window 10 is lowered. The window 10 is raised when the arm 56 turns counterclockwise and the arm 55 turns clockwise.

Figure 9:
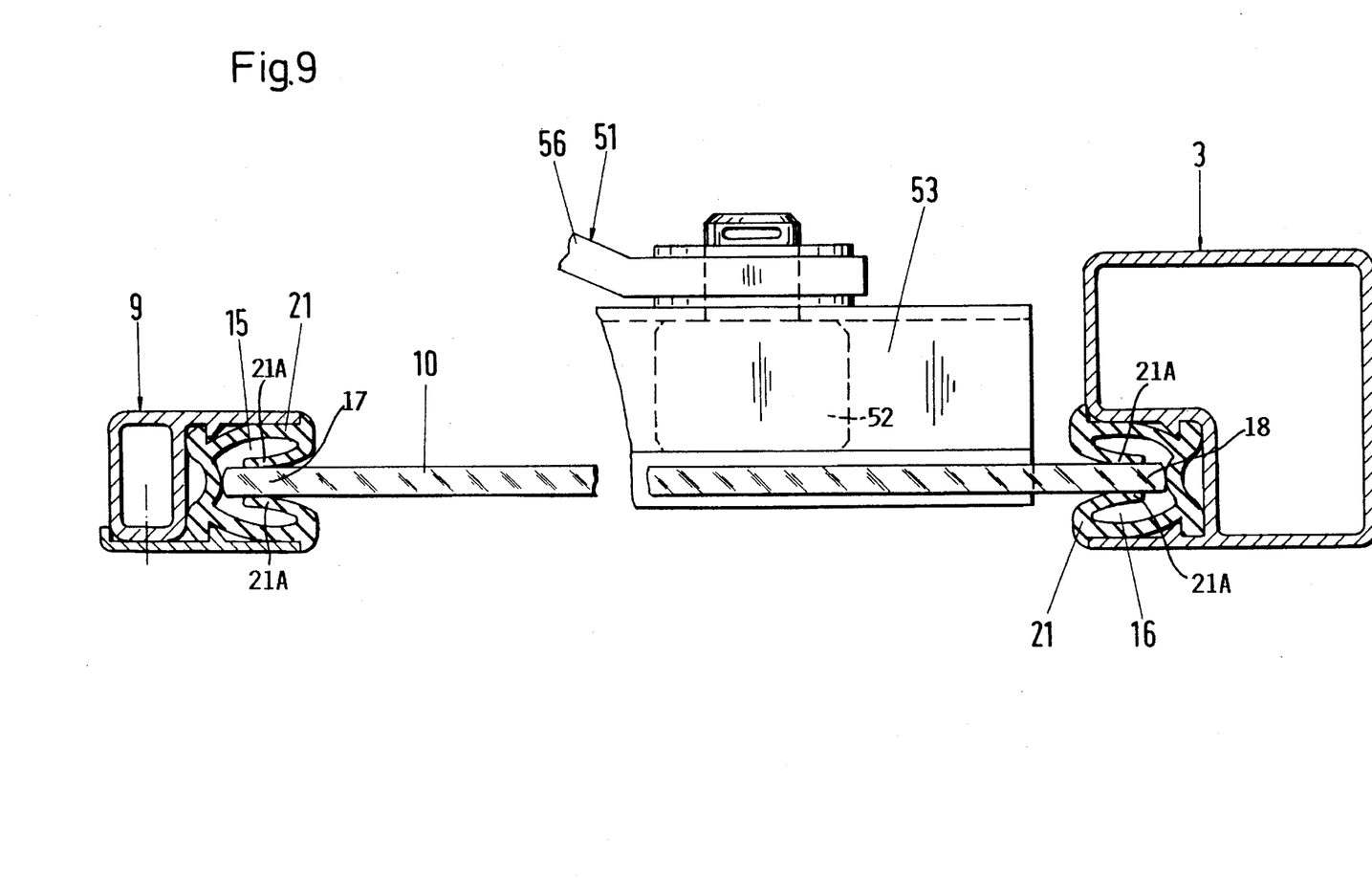
FIG. 9 is a sectional view along section line IX—IX in FIG. 8.

In FIG. 9 the window 10 is floatingly guided by the elastically yielding lips 21A of the sealing and guide elements 21 positioned in the respective chambers 15 and 16 of the window frame guide member 9 and the frame section 3 respectively.

Figure 10:
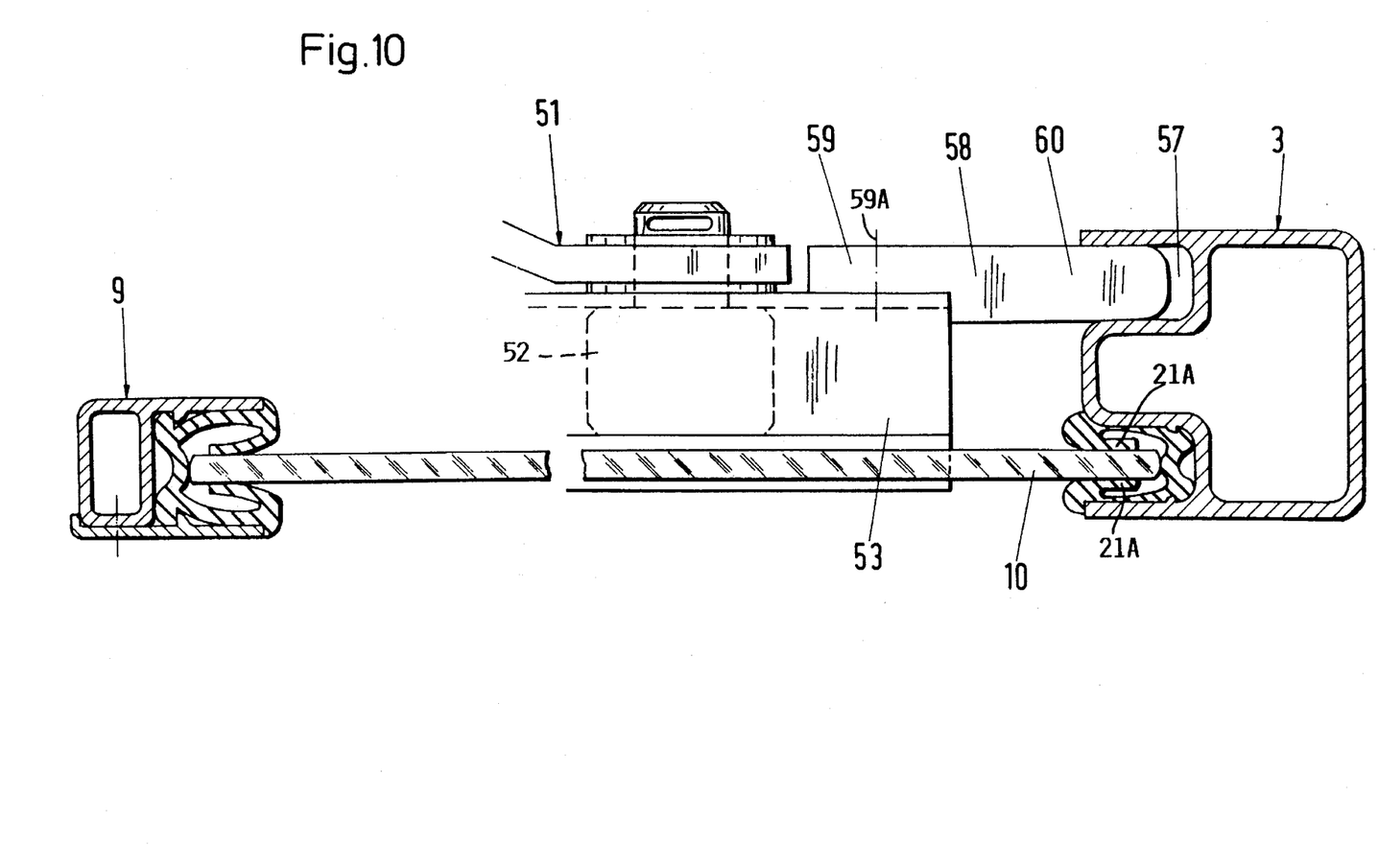
FIG. 10 is a sectional view similar to that of FIG. 9, however, illustrating a modified window guide.

In FIG. 10 the window pane 10 is guided in the window frame member 9 and in the rear frame section 3 as just described. However, the rail 53 that is secured to the lower edge 24 of the window pane 10, for example by an adhesive, is guided in a guide groove 57 in the rear frame section 3. For this purpose, an intermediate piece 58 is secured with one end 59, for example by screws 59A, to the rail 53. A free slide end 60 of the piece 58 engages into the guide groove 57 of the rear frame section 3. A more positive guiding is achieved in this embodiment due to the guiding at 57 and at 21A.

Figure 11:
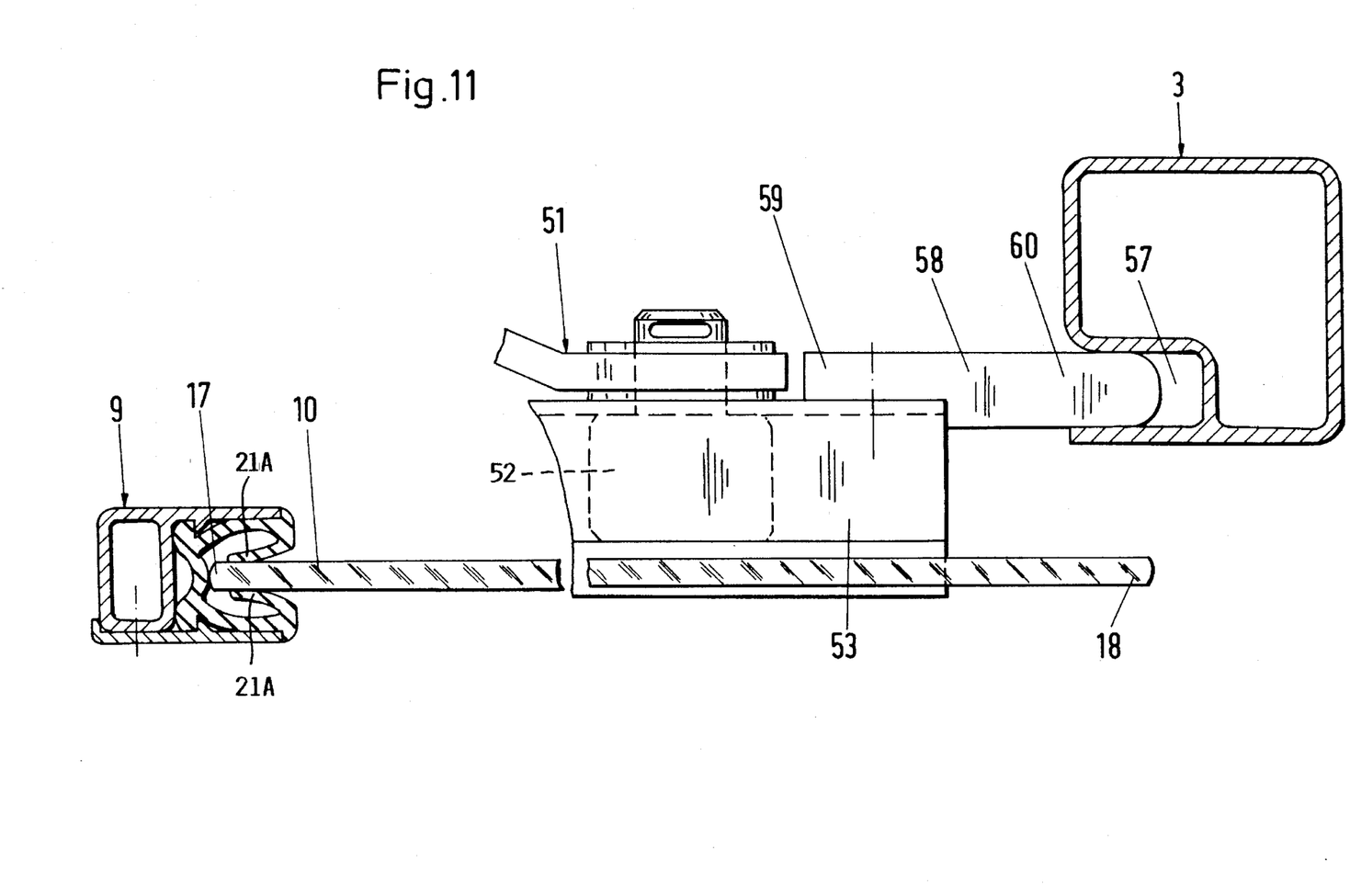
FIG. 11 is a sectional view similar to that of FIGS. 9 and 10, however showing a further modification of the window guide structure for a convertible passenger car.

FIG. 11 illustrates a door and window construction for a passenger convertible. The forward edge 17 of the window pane 10 is guided as described above. However, the rear edge 18 of the window pane is guided only indirectly through the rail 53 which is connected through the intermediate piece 58 in a sliding manner to the rear frame section 3 which also has the guide groove 57 engaged by the sliding free end 60 of the intermediate piece 58 connected with its other end 59 to the rail 53 as described. The rail 53 would again be part of a lazy-tong lifting and lowering device as described above.

Figure 12:
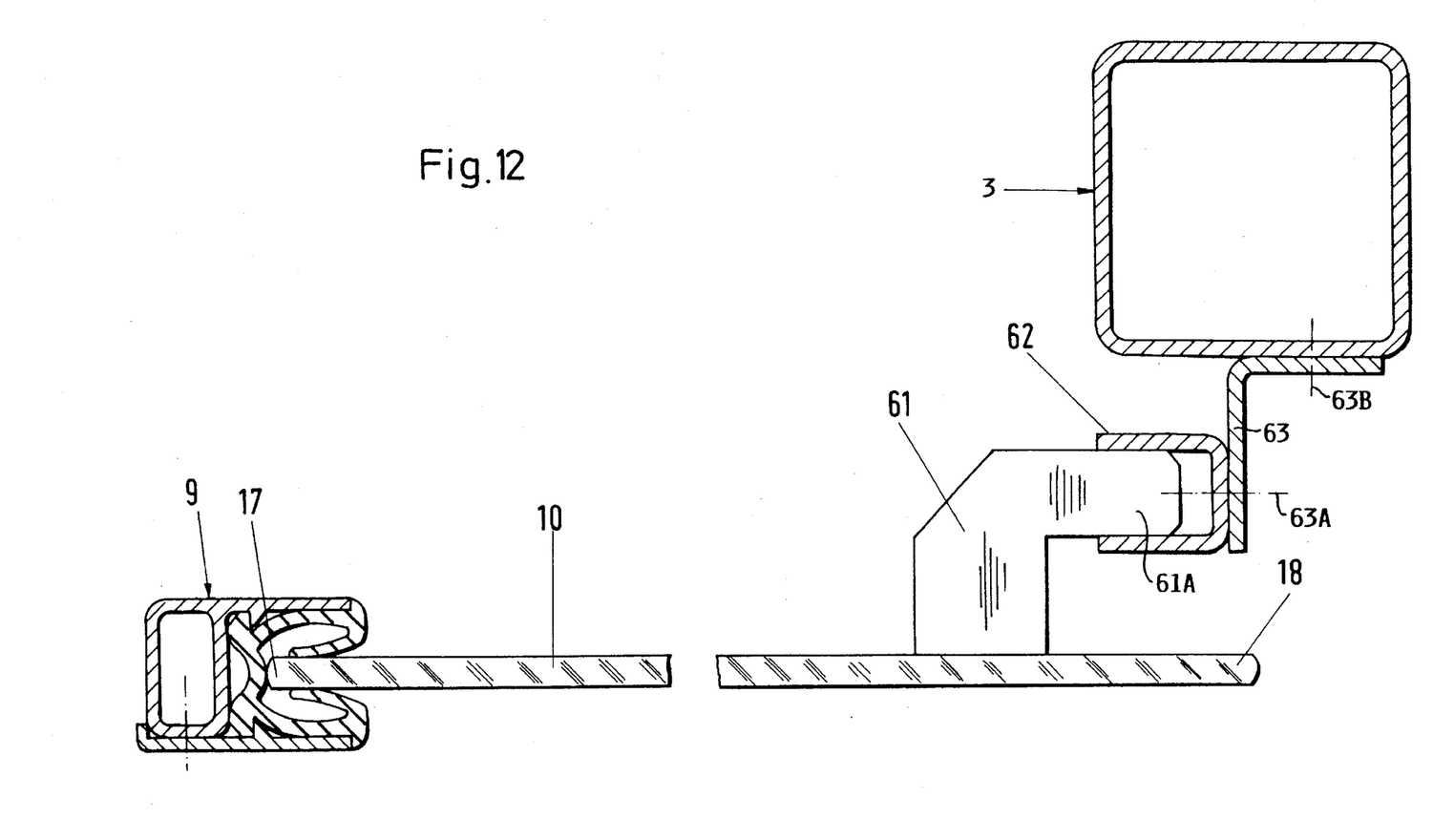
FIG. 12 is a sectional view similar to that of FIGS. 9, 10, and 11, however showing a further modification of the window guide structure.

The embodiment of FIG. 12 is also intended for a convertible passenger car. The forward edge 17 of the window pane 10 is guided as described in the window frame member 9. The rear edge 18 of the pane 10 is free. However, an intermediate connecting piece 61, for example, adhesively or otherwise connected to the rear edge of the window pane 10, is guided with its guide end 61A in a U-channel 62 which in turn is suitably connected to the rear frame section 3, for example, by an L-section 63 secured by screws 63A to the U-channel 62 and by screws 63B to the rear frame section 3.

Although the invention has been described with reference to specific example embodiments, it will be appreciated that it is intended to cover all modifications and equivalents within the scope of the appended claims.

What we claim is:

1. A vehicle door having a frame structure forming a load supporting door frame module (1), comprising at least one forward frame section (2), at least one rear frame section (3), and an upper frame section (1A, 4) interconnecting said forward and rear frame sections, a window (10), a window lifting and lowering mechanism (11, 41, 51), and a window guide including a rear guide section (3A) integrated in said rear frame section (3), said window guide of said door frame module further comprising a forward window guide member (9) integrated in said door frame module (1) to form a structural unit with said door frame module (1), said forward window guide member (9) extending at least along a full window opening and closing stroke, said forward window guide member (9) comprising a hollow section (25, 26), and wherein each of said guide section (3A) and said guide member (9) comprise a respective guide chamber (16, 15 or 57), said guide chambers having laterally open sides facing each other for holding and guiding said window (10).

2. The vehicle door of claim 1, wherein at least said window guide section (3A) and said window guide member (9) are extruded sections.

3. The vehicle door of claim 1, wherein at least certain of said frame sections including said forward guide member are extruded hollow sections.

4. The vehicle door of claim 1 further comprising a sealing element (21) with elastic sealing lips (21A) in each of said guide chambers (15, 16), said sealing element reaching in a U-configuration around a respective edge (17, 18) of said window (10).

5. The vehicle door of claim 1, further comprising a bottom frame section (5) forming a fully closed frame with said forward frame section (2), said rear frame section (3), and said upper frame section (4).

6. The vehicle door of claim 1, further comprising a diagonal bracing strut (6) connecting said forward frame section (2) to said rear frame section (3), and a cross-bar (7) also connecting said forward and rear frame sections.

7. The vehicle door of claim 1, wherein said forward window guide member (9) comprises at least two portions (25 and 29) interconnected with each other (at 29A).

8. The vehicle door of claim 7, wherein said forward window guide member (9) comprises a hollow profile portion (25, 26) with an integral wall extension (27) and a cover (28), said wall extension (27) and said cover (28) forming said laterally open guide chamber (15), and a connector (29A) securing said cover (28) to said hollow profile portion (26).

9. The vehicle door of claim 1, wherein said guide chamber (16) of said rear frame section (3) comprises guide ribs (30, 31) for guiding said window (10), said guide ribs (30, 31) having an F-shaped cross-section including an extension (32) securing said guide ribs (30, 31) to a wall (33) of said rear frame section (3), said window (10) comprising a guide piece (34) secured to said window (10), said guide piece (34) engaging said guide ribs (30, 31).

10. The vehicle door of claim 1, wherein said window lifting and lowering mechanism comprises a rope window lifting and lowering device (11).

11. The vehicle door of claim 1, wherein said window lifting and lowering mechanism comprises a cable window lifter (41) including a push-pull cable (44), and wherein said rear frame section (3) and said window guide member (9) comprise cable guide channels (43) for guiding said push-pull cable (44).

12. The vehicle door of claim 12, wherein said cable guide channels (43) are open parallel to said window (10).

13. The vehicle door of claim 1, wherein said window lifting and lowering mechanism comprises a lazy-tong mechanism (51).

14. The vehicle door of claim 13, wherein said lazy-tong mechanism further comprises a tong drive (52) and a first guide rail (54) rigidly mounted to said rear frame section (3) and to said forward window guide member (9), and a second guide rail (53) secured to a lower edge (24) of said window (10), said lazy-tong mechanism comprising two lazy-tong arms (55, 56) journalled (at 51A) to each other, one of said lazy-tong arms (55) having one end (55A) guided by said second guide rail (53) and another end (55B) guided by said first guide rail (54), the other of said lazy-tong arms (56) having one end (56A) guided by said second rail (53) and another end (56B) operatively connected to said tong drive (52) for raising and lowering said window (10).

15. The vehicle door of claim 14, further comprising a guide groove (57) in said rear frame section (3), and wherein said second guide rail (53) secured to said lower edge of said window (10) comprises an extension (58) having a free end (60) riding in said guide groove (57) of said rear frame section (3).

16. The vehicle door of claim 15, wherein said extension (58) is an intermediate piece having one end (59) rigidly connected (at 59A) to said second guide rail (53) opposite said free end (60) riding in said guide groove (57).

17. The vehicle door of claim 15, wherein in a door for a convertible said guide groove (57) of said rear frame section (3) forms one guide channel which is displaced relative to a rear edge (18) of said window (10) so that said rear edge (18) is indirectly guided through said extension (58) riding with said free end (60) in said one guide channel (57).

18. The vehicle door of claim 15, wherein in a door for a convertible only a front edge (17) of said window is guided by said forward window guide member (9), and wherein said rear frame section (3) is displaced relative to a rear edge (18) of said window (10).

19. The vehicle door of claim 15, wherein in a door for a convertible a forward edge (17) of said window (10) is guided in said forward window guide member (9), and wherein said window (10) further comprises an intermediate piece (61) having a free end (61A) guided by said rear frame section (3).

20. The vehicle door of claim wherein said rear frame section (3) comprises a U-channel (62) secured to said rear frame section (3), said free end (61A) of said intermediate piece (61) riding in said U-channel (62).

* * * * *

UNITED STATES PATENT AND TRADEMARK OFFICE
CERTIFICATE OF CORRECTION

PATENT NO. : 5,469,668

DATED : Nov. 28, 1995

INVENTOR(S) : Heim et al.

It is certified that error appears in the above-identified patent and that said Letters Patent is hereby corrected as shown below:

COLUMN 8:
In Claim 12, line 1, replace "claim 12," by --claim 11--.
In Claim 20, line 1, after "claim" insert --19,--.

Signed and Sealed this

Nineteenth Day of March, 1996

Attest:

BRUCE LEHMAN

*Attesting Officer*     *Commissioner of Patents and Trademarks*